United States Patent
Muller et al.

(10) Patent No.: US 6,363,256 B1
(45) Date of Patent: Mar. 26, 2002

(54) CORDLESS TELEPHONE AND CLOCK MANAGEMENT METHOD

(75) Inventors: Nicolas J-P. Muller, Le Mans; Christophe Lorieau, Guecelard, both of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/211,150

(22) Filed: Dec. 14, 1998

(30) Foreign Application Priority Data

Dec. 15, 1997 (FR) ............................................. 97 15877
Jan. 7, 1998 (FR) ............................................. 98 00081

(51) Int. Cl.7 ................................................. H04Q 7/20
(52) U.S. Cl. ......................................... 455/462; 455/550
(58) Field of Search ................................. 455/462, 464, 455/550, 463, 465, 90, 575, 404; 368/13, 47; 375/354

(56) References Cited

U.S. PATENT DOCUMENTS 5,619,553 A * 4/1997 Young et al. ................ 455/463
5,682,605 A * 10/1997 Salter .......................... 375/145
5,805,530 A * 9/1998 Youngberg ................... 368/47
5,825,648 A * 10/1998 Karnowski .................... 700/82

FOREIGN PATENT DOCUMENTS

JP     6120881 A     4/1994     ............ H04B/7/26

* cited by examiner

*Primary Examiner*—Dwayne Bost
*Assistant Examiner*—L West
(74) *Attorney, Agent, or Firm*—Dicran Halajian

(57) ABSTRACT

A cordless telephone system includes a base station having a base clock indicative of the time of day, and a handset having a handset clock indicative of the time of day. The handset is synchronized to the base station. When power is lost in the handset or the base station, the unit with power detects loss of synchronization therebetween. Upon restoration of the power, the continually powered unit provides the power restored unit with clock recovery information for updating the clock of the power restored unit. The clock recovery information is generated in the continually powered unit by counting elapsed time when the loss of synchronization is detected.

15 Claims, 4 Drawing Sheets

CORDLESS TELEPHONE AND CLOCK MANAGEMENT METHOD

FIELD OF THE INVENTION

The invention relates to a cordless telephone comprising at least a base station with a clock, a handset and clock correction means.

The invention also relates to a base station and a handset intended to be used in such a telephone.

The invention also relates to a method of managing clocks for a cordless telephone.

The invention finds important applications, notably for cordless telephones of which the base station has a function of answering machine with date-time stamping of the received messages. For such applications it is necessary to have a calendar in the base station(s).

BACKGROUND OF THE INVENTION

Patent abstract of Japan no. A-06 120 881 describes a cordless telephone having a base station and a handset which include each a clock circuit. The clock of the base station is controlled by a clock generation circuit in the telephone switch that connects the base station to the telephone line. And clock correction means are provided for correcting the clock of the handset based on the clock of the base station.

SUMMARY OF THE INVENTION

It is an object of the invention to propose a cordless telephone having an autonomous, simple and economic time system.

For this purpose, a telephone according to the invention and as described in the opening paragraph is characterized in that said clock correction means comprise:

means for the base station to detect a loss of said clock,
means for at least one handset to generate clock recovery information,
means for the handset to transmit said clock recovery information to the base station.

The invention thus makes use of the fact that handsets have a power supply battery which gives them large autonomy in case of a power cut. When the base station has lost its time, for example, after a power cut, recovery information can be transmitted thereto by the handsets. The invention thus enables to do without the use of a specific autonomous back-up and counting element in the base station to continue calculating the clock notably in case of a power cut.

In a first embodiment of the invention, said base station comprises a non-volatile back-up memory of said clock and said recovery information generating means comprise calculation means for calculating the time elapsed between the detection of the loss of the clock and the transmission of the recovery information.

In a second embodiment of the invention, the handset has a clock slaved to that of the base station for delivering said recovery information.

In this embodiment, the clock of the handsets is normally updated by the base station. This embodiment thus enables to do without the use of a non-volatile memory for regularly backing up the system clock. The use of a non-volatile memory actually has the following drawback: the counting of the duration of a power cut by the handset contains an error that is equal to the delay between the last backing up of the clock in the base station and the start of the power cut.

To remedy this, the rate of the clock back-ups (of the order of several seconds) is to be increased. The number of times a non-volatile memory is written is limited, which provides that after a certain period of time (several years) the clock system will no longer function correctly.

Finally, a clock management method according to the invention and as described in the opening paragraph is characterized in that it comprises:

detecting a loss of said clock by the base station,
generating recovery information of said clock in at least one handset,
transmitting said recovery information to the base station by the handset.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
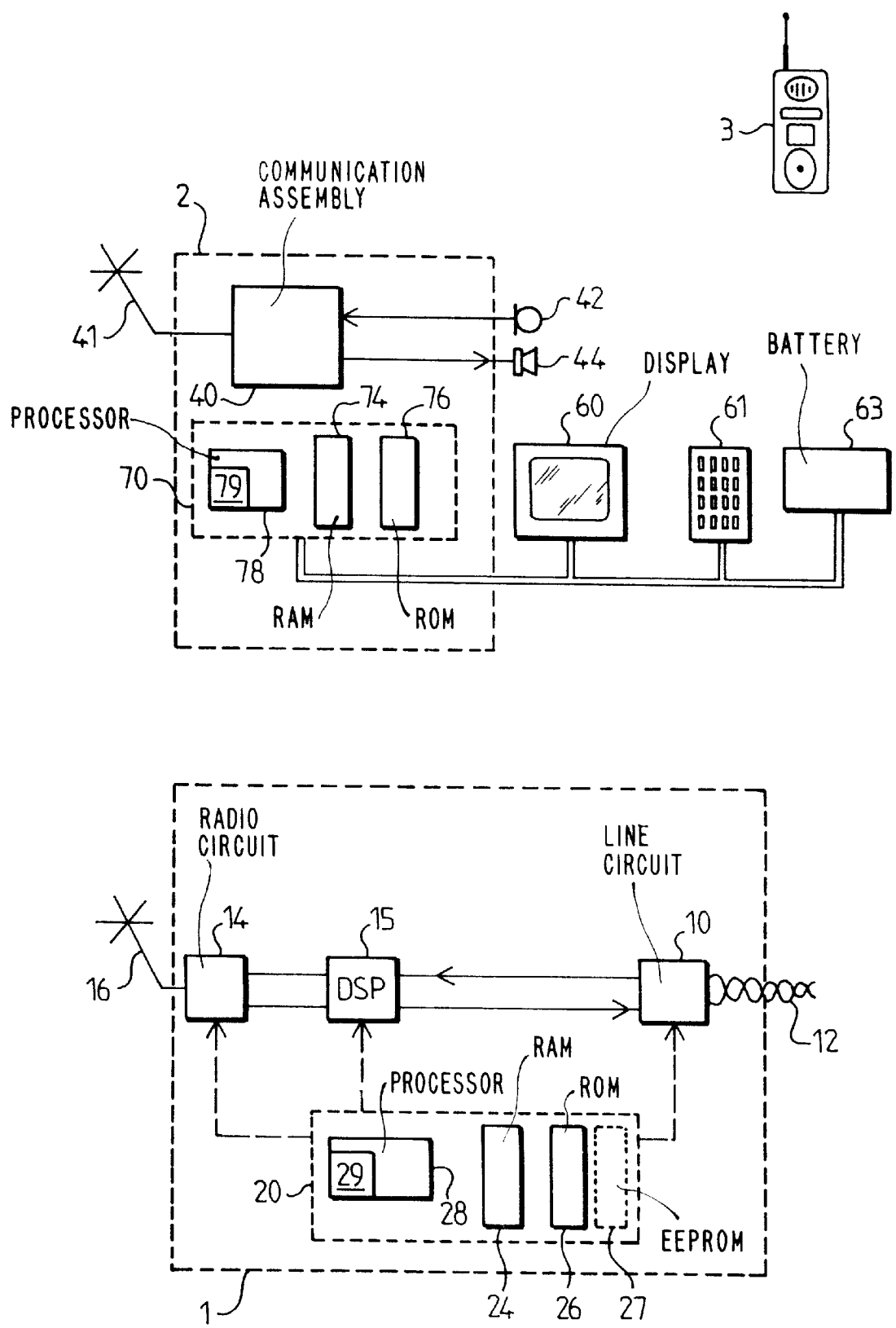
FIG. 1 diagrammatically shows an example of a telephone according to the invention, FIG. 2 diagrammatically shows the operation of a handset according to the invention as regards the clock management in the first embodiment of the invention, FIG. 3 diagrammatically shows the operation of a base station according to the invention as regards the clock management in the first embodiment of the invention, FIG. 4 diagrammatically shows the operation of a handset according to the invention as regards the clock management in the second embodiment of the invention, and FIG. 5 diagrammatically shows the operation of a base station according to the invention as regards the clock management in the second embodiment of the invention.

In FIG. 1, the cordless telephone shown is a telephone meeting the DECT standards. Reference 1 shows a base station to which one or various handsets 2, 3 . . . are connected by radio. This base station 1 notably comprises a line circuit 10 which enables the base station to be connected to the switched circuit via a telephone line 12 and a radio circuit 14, which authorizes the dialogue with the various handsets 2, 3, . . . , by transmitting and receiving waves via an antenna 16. The circuits 10 and 14 are connected via a signal processing circuit 15 formed around a signal processor DSP. All these elements of the base station 1 are managed by a microprocessor assembly 20 which is usually notably formed by a random-access memory 24, a read-only memory 26 which contains operating instructions of the telephone and by a management processor 28 which contains a time base 29.

In the first embodiment of the invention, the microprocessor assembly 20 moreover includes a non-volatile memory 27, for example, a FLASH memory or an EEPROM memory.

Only the handset 2 is shown in detail in FIG. 1, as the handsets 3, . . . can have an identical structure. It comprises a communication assembly 40 having an antenna 41 which enables it to communicate with the base station 1. This assembly processes the information coming from the microphone 42 and also produces signals for an earphone 44. The handset 2 also includes a display 60 on which some information can be displayed, a keyboard 61 and a power supply battery 63. A management element 70 is also included. Just like assembly 20, it is formed by a random-access memory 74, a read-only memory 76 which contains operating instructions and a management processor 78 which contains a time base 79.

In the first embodiment of the invention, clock recovery information is transmitted to the base station 1 by the handsets 2, 3, . . . when they detect that the base station has lost its time. In the example that has just been described, such a loss is detected when there is a desynchronization of base station and handset. In fact, the power cuts (which prevent the base station from keeping its time updated and which thus cause the loss of this time) are one of the causes of a loss of synchronization of base station and handset. The choice of this criterion enables to maximize the limitation of unwanted transmissions of recovery information from the handset to the base station.

Figure 2:
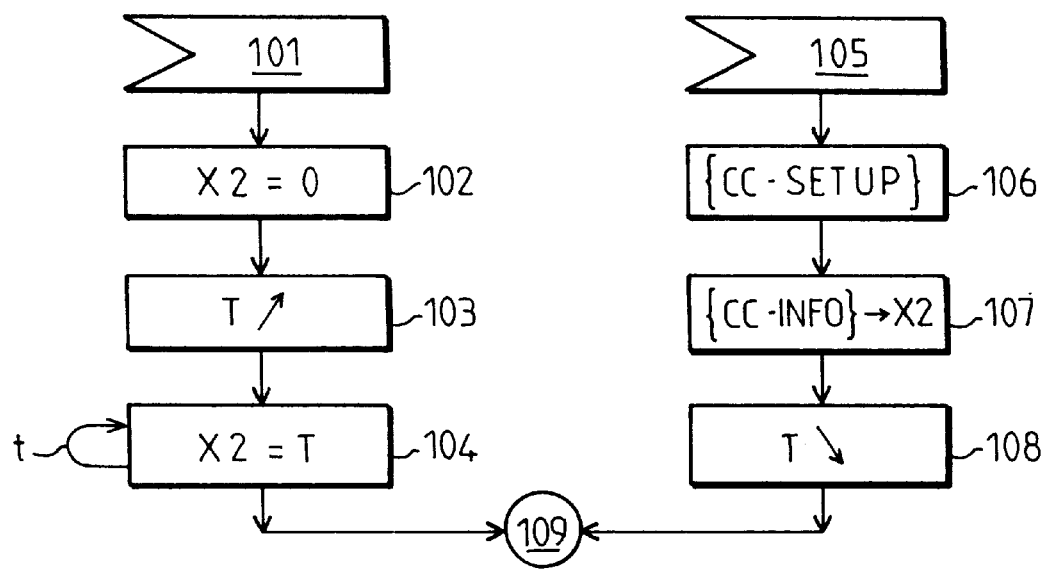

FIG. 2 diagrammatically shows the operation of the handset as regards the clock management.

When a handset loses the synchronization with the base station (box 101), it knows that this is no longer provided and thus that there is a risk of losing its time. The handset thus keeps this information updated for the base station: in box 102 it initializes a variable X2 (called recovery information) and in box 103 it starts counting the time T that elapses. The variable X2 is regularly updated, for example, every second, whereas the synchronization of base station and handset is not re-established (this is symbolized for box 104 by the arrow t). When the synchronization of base station/handset is re-established (box 105), the handset sets up a link (called proprietary link) to the base station in box 106. By this proprietary link it transmits the recovery information X2 to the base station (box 107). And in box 108 it stops counting. The operation is terminated in box 109.

Figure 3:
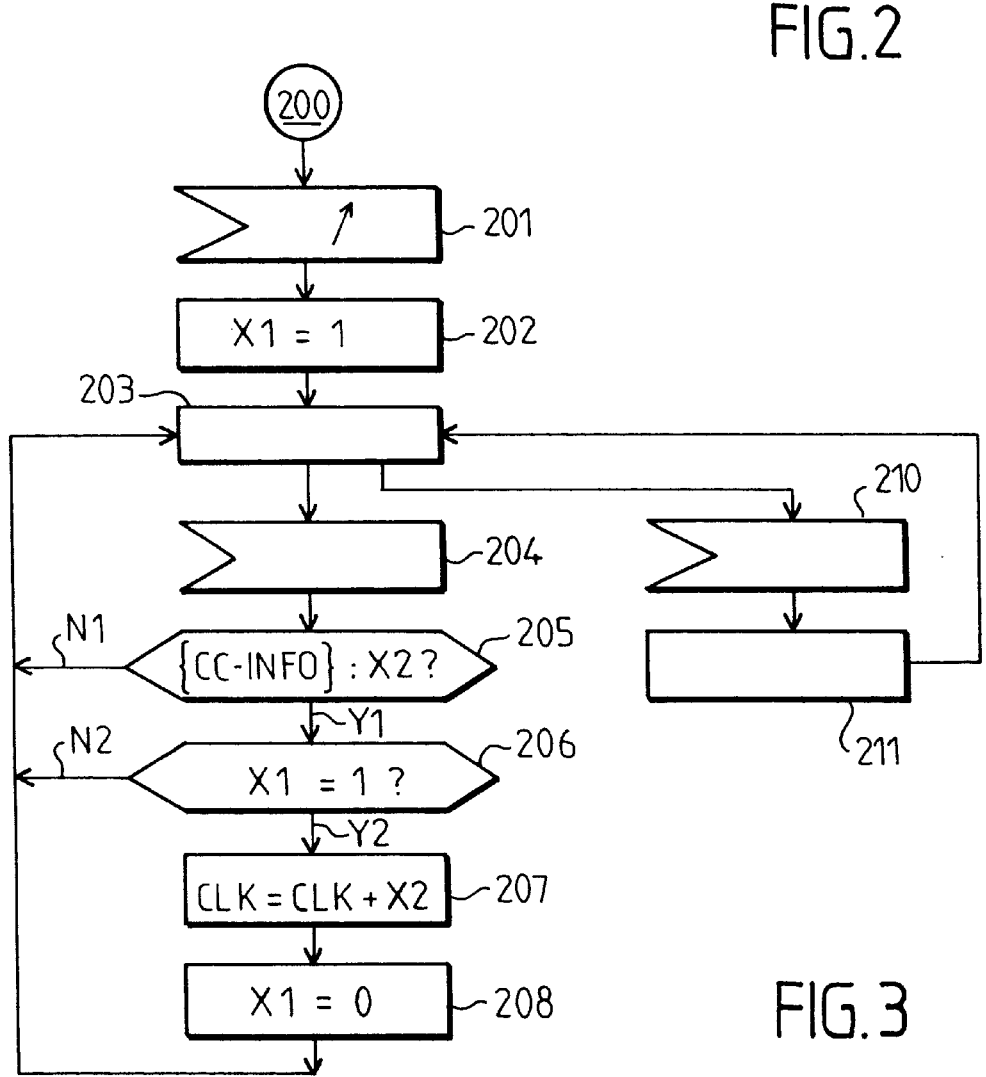

FIG. 3 diagrammatically shows the operation of the base station as regards the clock management.

In box 200 the base station is switched off. In box 201 it is switched on. In box 202 the base station carries out various initialization operations, notably the initialization of a variable X1 which indicates the need to set the clock of the base station. Then, in box 203, the base station goes to the standby mode.

When a proprietary link is set up (box 204), the base station tests the nature of this link (box 205). If it is a link dedicated to the clock management (branch Y1 in the Figure), the base station tests the variable X1 (box 206). And if the contents of the variable X1 are equal to 1 (branch Y2 in the Figure), it updates its clock CLK stored in the non-volatile memory 27 on the basis of the recovery information X2 which the handset has transmitted to the base station by the proprietary link (box 207). Then, in box 208, the base station sets the variable X1 to zero.

When the user has set the time of the base station (box 210) by hand, the base station updates its clock CLK stored in the non-volatile memory 27 (box 211).

At the end of the boxes 208 and 211, and when the tests made in boxes 205 and 206 are negative (branches N1 and N2), the operation is resumed in box 203, that is to say, when the base station has gone to the standby mode again.

The clock of the base station is then kept updated thanks to the time base 29 of the processor 28. This clock is periodically backed up in the non-volatile memory 27. The contents of the non-volatile memory are not erased when there is a power cut, so that it will thus be sufficient to add thereto the contents of the variable X2 transmitted by one of the handsets for restoring a calendar.

The second embodiment of the present invention enables to do without the use of a non-volatile memory. Therefore, both the handset and the base station have a simple memory for backing up its clock, and counting means for keeping the information backed up every day. When the handset has lost its clock, the base station will transmit its clock thereto and vice versa. In this embodiment, the recovery information is formed by the clock itself.

Figure 4:
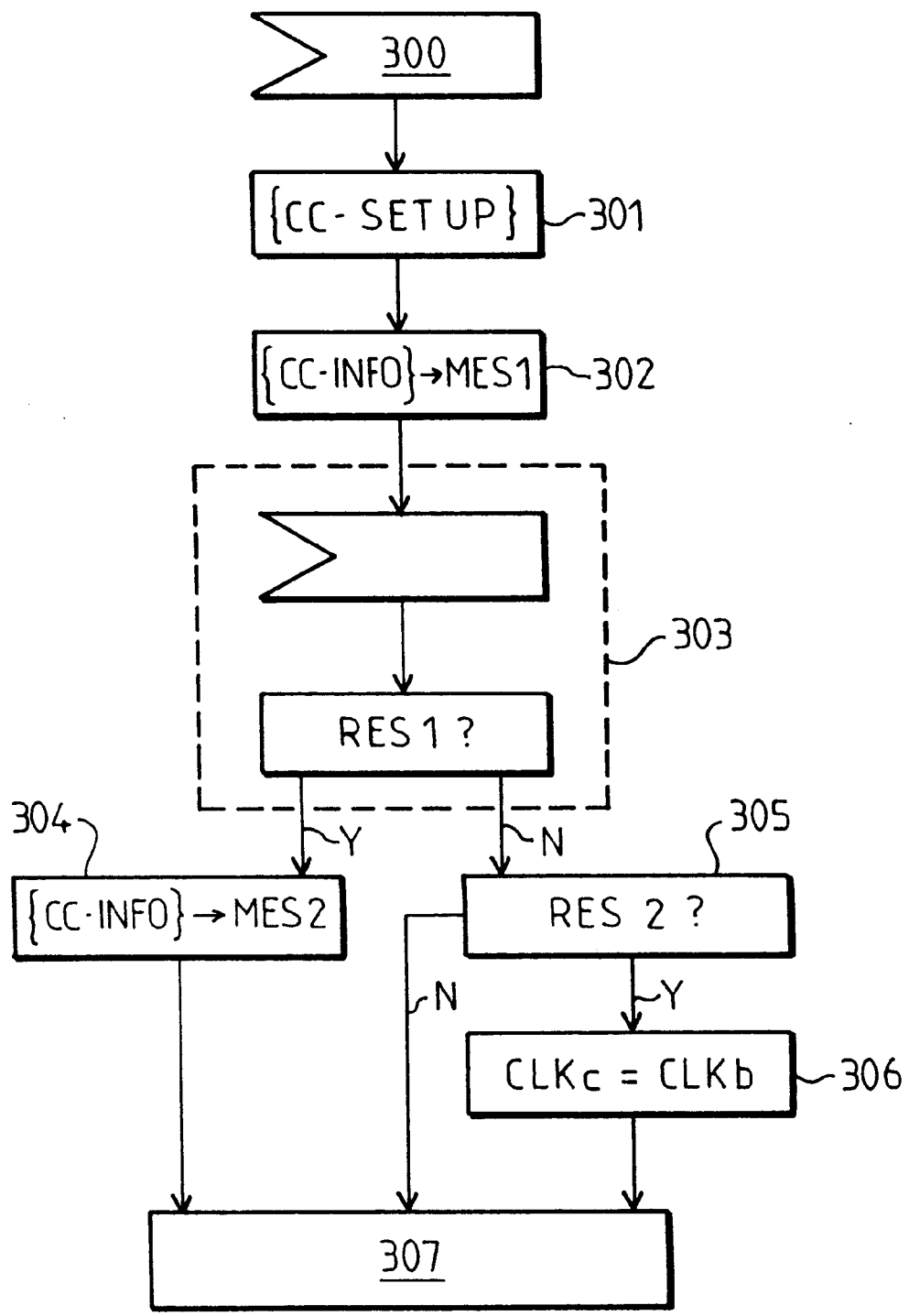

FIG. 4 diagrammatically shows the operation of the handset as regards the clock management in this second embodiment.

In box 300, the handset detects a resynchronization of base station and handset. In box 301 it thus sets up a link (called proprietary link) to the base station. By this proprietary link it transmits a request for a clock (MES1) to the base station in box 302. When it receives the response from the base station, the handset tests the type of this response. In box 303 it tests whether the response from the base station is a clock request (RES1). In that case, the handset transmits its own clock (MES2) to the base station in box 304 by the proprietary link set up earlier. If not, it tests in box 305 whether the response from the base station is a message (RES2) containing recovery information. If that is the case, it updates its own clock CLKc based on the recovery information received CLKb (box 306). After the boxes 304, 305 and 306, the operation is terminated in box 307.

Figure 5:
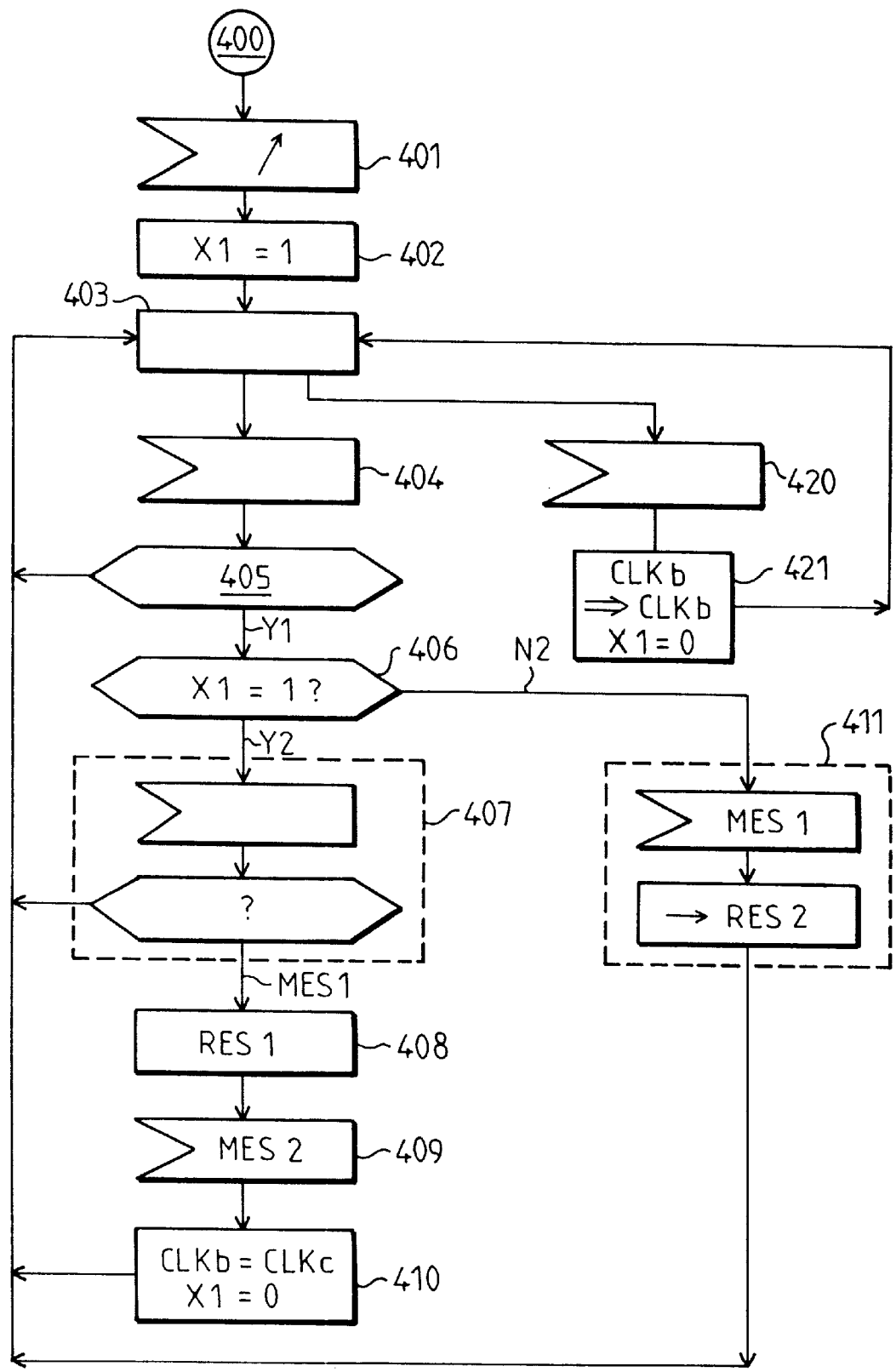

FIG. 5 diagrammatically shows the operation of the base station as regards the clock management in this second embodiment.

In box 400, the base station is switched off. In box 401 it is switched on. In box 402 the base station carries out various initialization operations, notably the initialization of a variable X1 that indicates the need to set the time of the base station. Then, in box 403, the base station goes to the standby mode.

When a proprietary link is set up (box 404), the base station tests the type of this link (box 405). If this is a link dedicated to the clock management (branch Y1 in the Figure), the base station tests the variable X1 in box 406 (if not, the operation is resumed in box 403):

If the contents of the variable X1 are equal to 1 (branch Y2 in the Figure), when it receives a message coming from the handset via this proprietary link, the base station tests the type of this message (box 407). If this is a message asking for the time (MES1), it sends a message (RES1) asking for the time back to the handset (box 408), and goes to the standby mode to receive a message containing recovery information (MES2). When the base station receives this message (box 409), it updates its clock CLKb based on the recovery information received CLKc, after which it resets the variable X1 to zero (box 410). If not, the operation is resumed with box 403.

If the contents of the variable X1 are equal to 0 (branch N2 in the Figure), when it receives a message coming from a handset and asking for the time (MES1), the base station returns a message (RES2) containing recovery information formed by its own clock (box 411) to the handset.

When the user has set the clock of the base station by hand (box 420), the base station updates its clock CLKb, sets the variable X1 to zero, and broadcasts the new time to all the handsets, for example, by setting up a clock broadcasting proprietary link (box 421).

After the boxes 410, 411 and 421, and when the tests carried out in boxes 405 and 407 are negative, the operation is resumed in box 403, that is to say, the base station goes to the standby mode again.

In conformity with the DECT standard and by taking the same terminology, a proprietary link is set up, for example, in the following manner:

a handset sends to the base station a message {CC-SETUP} whose information element <<BASIC-SERVICE>> indicates a "service call set-up" (for more information the reader be referred to paragraphs 9.3.3.1 case D, 6.3.2.1 and 7.6.4 of part 5 of the standard);

the base station responds by sending back a message {CC-SETUP-ACK} (paragraph 6.3.2.3 of part 5 of the standard);

a proprietary link thus being established between the handset and the base station, messages {CC-INFO} can be exchanged between them. These messages contain, for example, a first reference which indicates the type of link (a clock management link or clock broadcasting link, for example), a second reference which indicates the type of message (messages MES1 and RES1 asking for the time or messages MES2 and RES2 for transmitting recovery information), and a data field containing the message itself, for example, the recovery information in the first embodiment and in the case of the messages MES2 and RES2 (paragraph 6.3.2.2 of part 5 of the standard).

Within the framework of the DECT standard, the loss of synchronization and the resynchronization are detected for example, in the following manner: part 3 of the DECT standard describes in paragraph 11.3.2 an "Idle-Locked" state which is the most neutral state in which the handset can be when it is located within the coverage area of the base station. The object of this state is to maintain the synchronization of base station and handset. Here it is considered that a leaving of the "Idle-Locked" state corresponds to a loss of synchronization and that, when the "Idle-Locked" state is entered, this corresponds to a resynchronization.

Although the invention has been described within the framework of the DECT standard (standard ETS 300 175 defined by ETSI), it is obvious that it is applicable to other cordless telephony systems.

What is claimed is:

1. A cordless telephone comprising at least a base station with a base clock indicating time of day, a handset and clock correction means, wherein said clock correction means comprise:

detection means for detecting a loss of said base clock, generation means for the handset to generate clock recovery information, said clock recovery information being generated during said loss by counting elapsed time when said loss of said base clock is detected, and transmission means for the handset to transmit said recovery information to the base station.

2. A cordless telephone as claimed in claim 1, wherein said base station comprises a non-volatile back-up memory of said base clock, and said generation means comprise calculation means for calculating the elapsed time elapsed between detection of the loss of the base clock by said detection means and transmission of the recovery information by said transmission means.

3. A cordless telephone as claimed in claim 2, wherein the detection means comprise means for detecting a loss of synchronization between the base station and handset, and the transmission means are controlled by means for detecting a resynchronization between the base station and the handset.

4. A cordless telephone as claimed in claim 1, wherein the handset has a handset clock slaved to the base clock of the base station for supplying said recovery information.

5. A cordless telephone as claimed in claim 4, wherein the handset comprises means for detecting the loss of said handset clock and means for asking the base station to transmit the base clock to the handset.

6. A cordless telephone as claimed in claim 5, wherein the means for detecting the loss of the handset clock comprise means for detecting a resynchronization between the base station and the handset.

7. A handset intended to be used in a cordless telephone as claimed in claim 1.

8. A base station intended to be used in a cordless telephone as claimed in claim 1.

9. A method of managing clocks in a cordless telephone comprising at least a base station having a clock indicating time of day and a handset, wherein the method comprises:

detecting a loss of said clock, generating in the handset clock recovery information, said clock recovery information being generated during said loss by counting elapsed time when said loss of said clock is detected, and transmitting said recovery information to the base station by the handset.

10. A cordless telephone system comprising: said a base station having a base clock indicative of a time of day; and a handset having a handset clock indicative said time of day; said handset being synchronized to said base station;

wherein one of said handset and said base station detects loss of synchronization between said handset and said base station and provides to another of said handset and said base station clock recovery information for updating one of said base clock and said handset clock;

said clock recovery information being generated during said loss by counting elapsed time when said loss is detected.

11. The cordless telephone system of claim 10, wherein said loss of synchronization is due to a power failure of said another of said handset and said base station.

12. The cordless telephone system of claim 10, wherein said another of said handset and said base station includes a memory for periodically storing one said base clock and said handset clock.

13. The cordless telephone system of claim 10, wherein said base station includes a non-volatile memory for periodically storing said base clock, said base clock stored in said non-volatile memory being updated by said clock recovery information when said synchronization is restored after said loss.

14. The cordless telephone system of claim 10, wherein said handset provides said handset clock to said base station for use as said base clock when said synchronization is restored after said loss.

15. A cordless telephone system comprising:

a base station having a base clock indicative of a time of day; and a handset having a handset clock indicative said time of day; said handset being synchronized to said base station;

wherein when said handset detects resynchronization after a loss of synchronization between said handset and said base station, said handset requests said time of day from said base station tests a response from said base station, and if said response is said base clock then said handset sets handset clock equal to said base clock, and if said response is a request from said base station for said time of day then said handset provides said base station with said handset clock so that said base station sets said base clock to said handset clock.

* * * * *